United States Patent
Desthieux et al.

(10) Patent No.: US 6,690,889 B2
(45) Date of Patent: Feb. 10, 2004

(54) DEVICE FOR COMPENSATING POLARIZATION DISPERSION IN AN OPTICAL TRANSMISSION SYSTEM

(75) Inventors: Bertrand Desthieux, Paris (FR); François-Xavier Ollivier, Guibeville (FR); Denis Penninckx, Nozay (FR)

(73) Assignee: Alcatel, Paris (FR)

( * ) Notice: Subject to any disclaimer, the term of this patent is extended or adjusted under 35 U.S.C. 154(b) by 477 days.

(21) Appl. No.: 09/726,038

(22) Filed: Nov. 30, 2000

(65) Prior Publication Data

US 2001/0006427 A1 Jul. 5, 2001

(30) Foreign Application Priority Data

Dec. 30, 1999 (FR) .............................. 99 16721

(51) Int. Cl.$^7$ .............................................. H04B 10/12
(52) U.S. Cl. ............... 398/147; 398/152; 398/154; 398/155; 398/158; 398/161; 398/162; 398/202; 398/209; 398/184; 398/195; 385/11; 385/15; 385/40; 356/73.1
(58) Field of Search ................. 398/147, 152, 398/154, 155, 158, 161, 162, 202, 209, 184, 195; 385/11, 15, 40; 356/73.1

(56) References Cited

U.S. PATENT DOCUMENTS

| | | | |
|---|---|---|---|
| 5,600,474 A | 2/1997 | Tomesen et al. | |
| 5,659,412 A * | 8/1997 | Hakki | 359/156 |
| 5,793,511 A | 8/1998 | Bulow | |
| 6,317,240 B1 * | 11/2001 | Penninckx et al. | 359/161 |
| 6,339,489 B1 * | 1/2002 | Bruyere et al. | 359/156 |
| 6,559,991 B1 * | 5/2003 | Farley et al. | 359/156 |

FOREIGN PATENT DOCUMENTS

| | | |
|---|---|---|
| EP | 0 853 395 A1 | 7/1998 |
| EP | 0 909 045 A2 | 4/1999 |

\* cited by examiner

Primary Examiner—Jason Chan
Assistant Examiner—Hanh Phan
(74) Attorney, Agent, or Firm—Sughrue Mion, PLLC

(57) ABSTRACT

The present invention is a device to increase the bit rate and distance at which data can be transmitted by optical fiber. The device compensates the polarization dispersion of the line by processing a received optical signal with the use of a polarization controller, the generation of a differential group delay between two orthogonal polarization modes and a control unit for the polarization controller. The data that is sent is redundant to enable detection of errors affecting the data received and the control unit is adapted to minimize the error rate calculated in real time by using the redundant data. The application of the device is to long-haul optical transmission, in particular over stranded fibers.

6 Claims, 3 Drawing Sheets

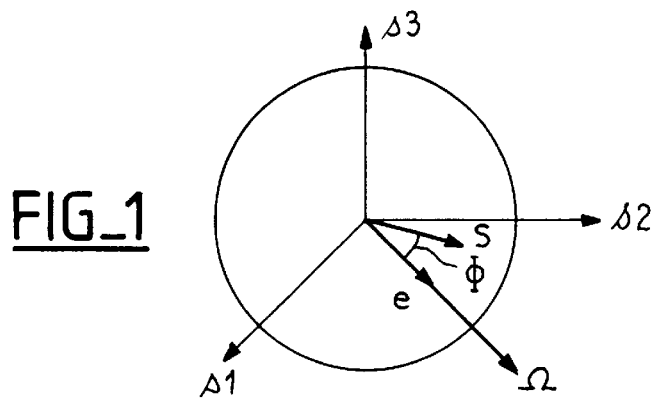
FIG_1
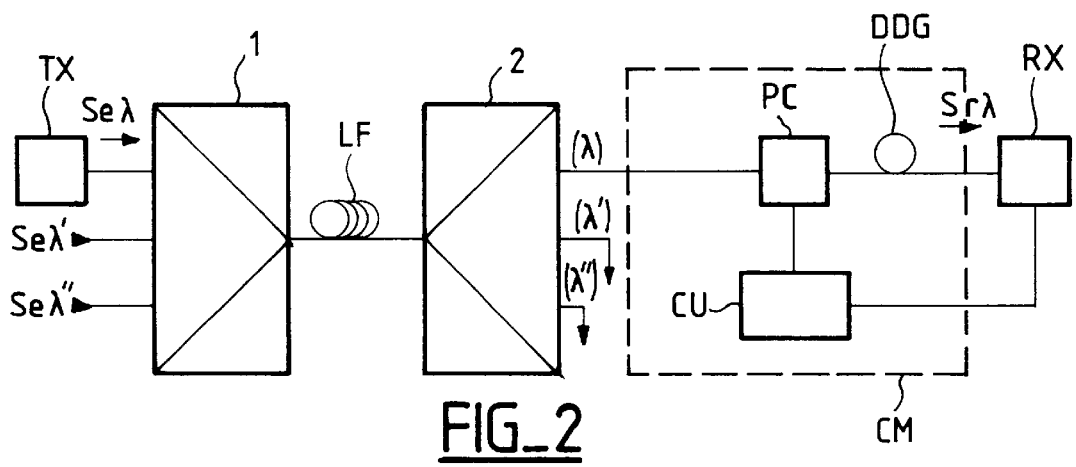
FIG_2
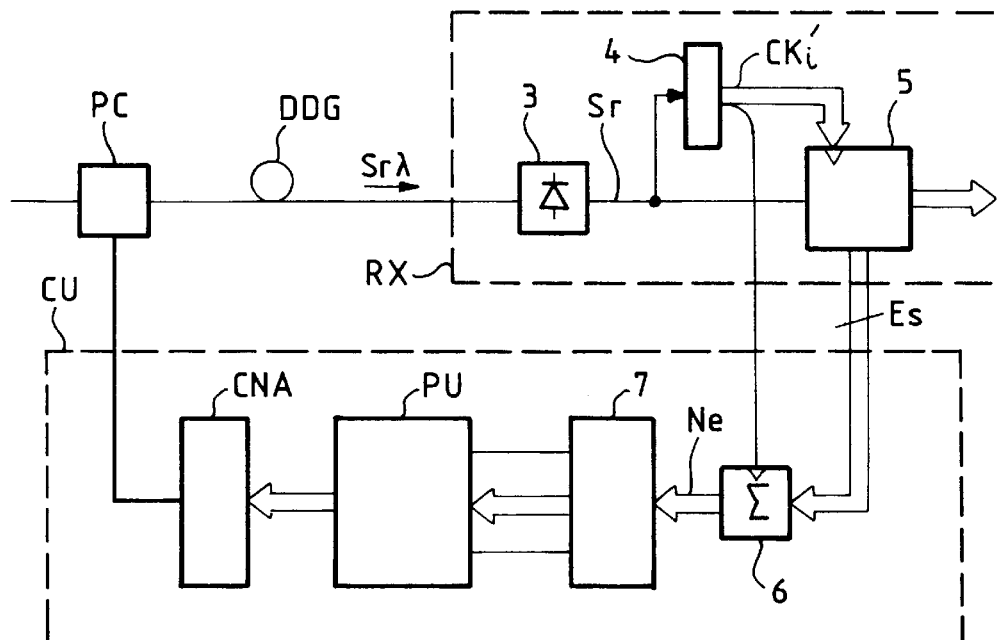
FIG_3

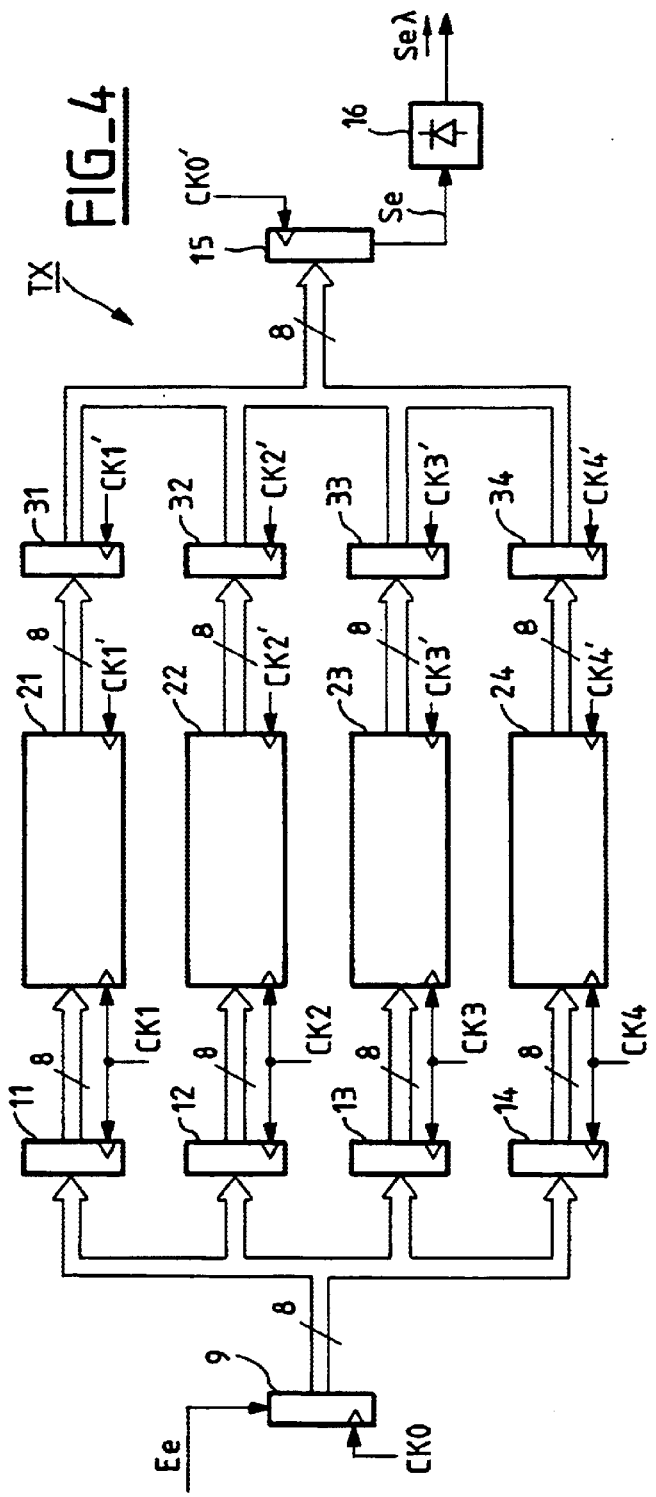
FIG_4
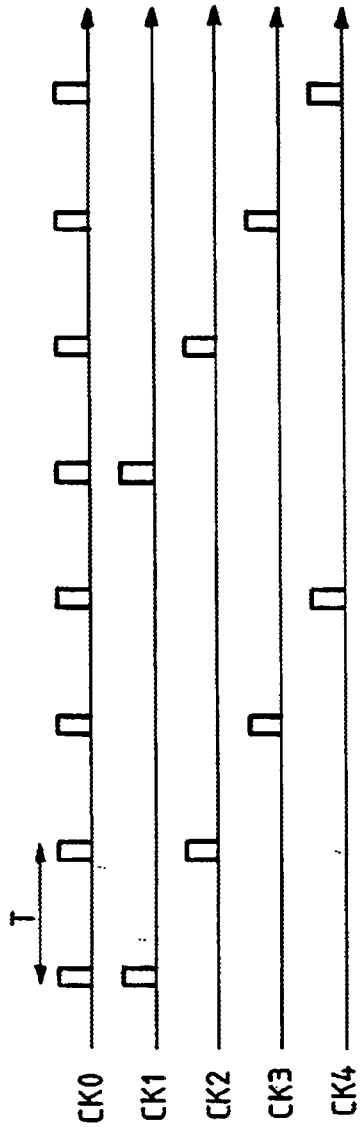
FIG_5

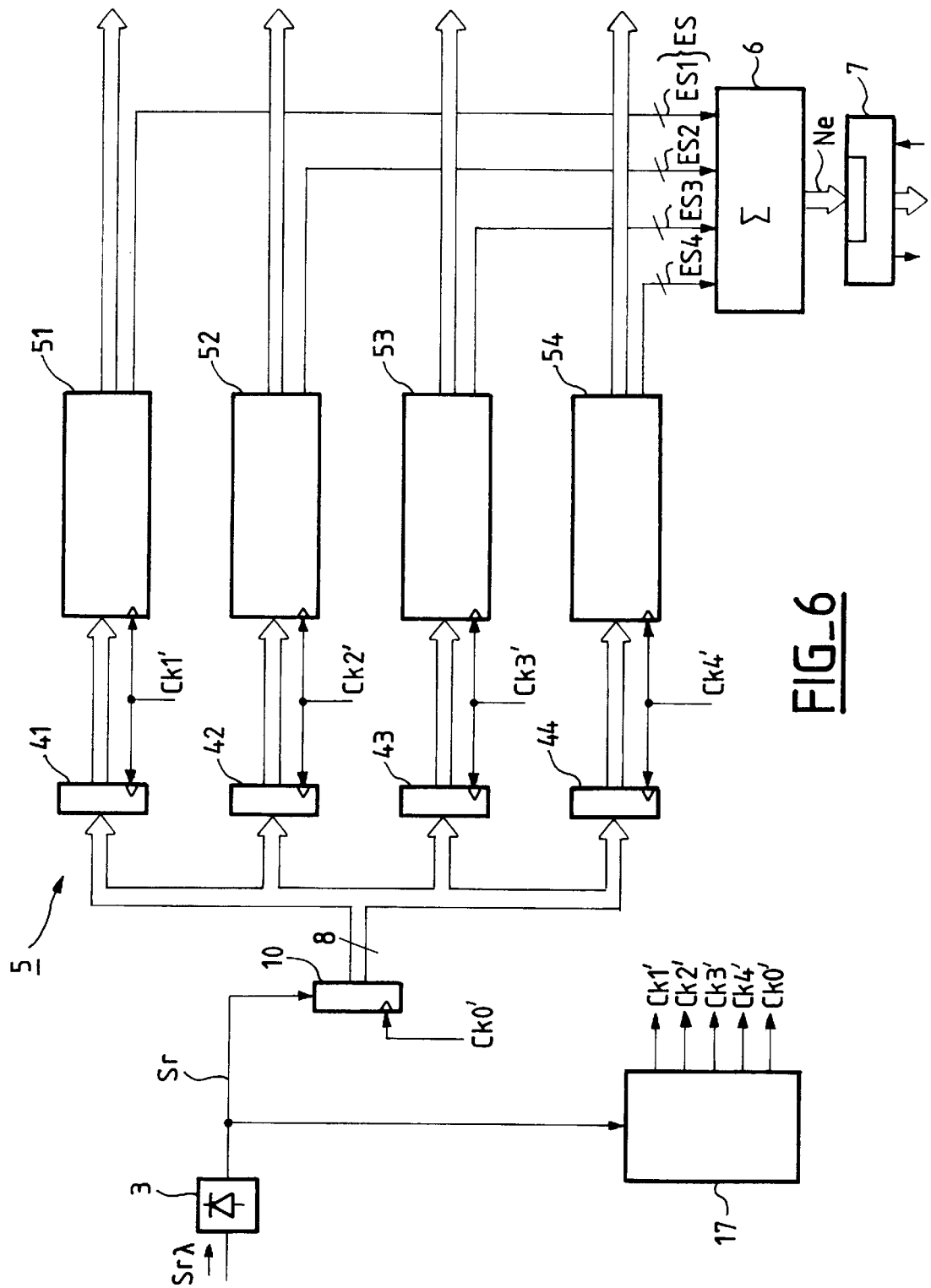
FIG_6

DEVICE FOR COMPENSATING POLARIZATION DISPERSION IN AN OPTICAL TRANSMISSION SYSTEM

The invention relates to the field of optical transmission of digital signals and more particularly transmission at high bit rates on long-haul lines using optical fibers.

The invention relates to a device for dynamically compensating at least some of the polarization dispersion that is observed in optical fiber transmission systems.

BACKGROUND OF THE INVENTION

An optical fiber transmission system typically includes:

- a transmit terminal using at least one optical carrier wave whose power and/or optical frequency it modulates with the data to be transmitted,
- an optical transmission line consisting of at least one section of monomode fiber conveying the signal sent by the transmit terminal, and
- a receive terminal receiving the optical signal transmitted by the fiber.

The performance of an optical transmission system, in terms of signal quality and bit rate in particular, is limited in particular by the optical properties of the line, which is subject to physical phenomena which degrade the optical signals. Of all the phenomena that have been identified, attenuation of the optical power and chromatic dispersion initially appeared to be the most constraining, and means have already been proposed for remedying at least some of the resulting degradation.

The attenuation in fibers of a given type depends on the signal carrier wavelength. Monomode fibers installed in the last decade, referred to as "standard fibers", have a minimum attenuation for a wavelength of around 1.5 $\mu$m, which has led to the choice of carriers around this value. What is more, to increase transmission distances further, attenuation has been compensated by means of optical amplifiers disposed at the upstream or downstream end of the line or all along the line.

The problem of chromatic dispersion is significant with standard fibers (approximately 17 ps/(km.nm) at 1.5 $\mu$m). One solution is to insert at least one dispersion compensating fiber (DCF) into the line.

Until now, the forms of compensation referred to above have ignored another unfavorable phenomenon referred to as "polarization mode dispersion". Under current optical transmission operating conditions, this phenomenon has long been considered to be negligible compared to chromatic dispersion, but this no longer applies when attempts are made to increase further the length of the line, and above all the bit rate.

Even in the absence of chromatic dispersion, and although the carrier wave supplied by a laser diode in the transmit terminal is totally polarized, the fibers are subject to polarization dispersion, one effect of which, for example, is that a pulse sent by the transmit terminal is received in a deformed state after it has propagated in a fiber, and has a duration greater than its original duration.

This deformation is due to the birefringence of the fiber, because of which the optical signal is depolarized during transmission. To a first approximation, the signal received at the end of the line fiber can be considered as made up of two orthogonal components, one of which corresponds to a state of polarization for which the propagation speed is maximum (fastest principal state of polarization) and the other to a state of polarization for which the propagation speed is minimum (slowest principal state of polarization). In other words, a pulsed signal received at the end of the line fiber can be considered to be made up of a first pulsed signal polarized with a preferred state of polarization and arriving first and a second pulsed signal propagating with a retarded propagation state and arriving with a time-delay referred to as the "differential group delay" (DGD), which depends in particular on the length of the line fiber. These principal states of polarization (PSP) therefore characterize the line.

Consequently, if the transmit terminal sends an optical signal consisting of a very short pulse, the optical signal received by the receive terminal consists of two successive and orthogonally polarized pulses having a relative time shift equal to the DGD. Because detection by the terminal consists of supplying in electrical form a measured value of the total optical power received, the detected pulse has a duration that is increased as a function of the DGD.

The DGD can be of the order of 50 picoseconds for 100 kilometers of standard fiber. The deformation of the pulses received by the receive terminal can cause errors in decoding the transmitted data and polarization dispersion therefore constitutes a factor limiting the performance of optical lines, whether analogue or digital.

The skilled person knows how the fabricate monomode fibers with a low polarization dispersion (approximately 0.05 ps/$\sqrt{\text{km}}$). However, the problem remains with "standard" fibers already installed, which have very high polarization dispersions, constituting a major technical obstacle to increasing the transmitted bit rates. What is more, this problem will also arise for fibers with low polarization dispersion when it becomes necessary to increase the bit rate further.

Also, the skilled person knows how to make fibers with high polarization dispersion, also referred to as polarization maintaining fibers (PMF). These can be used in short lengths to obtain a fixed differential group delay with invariant principal states of polarization. By judiciously disposing a component of this kind (or any means of generating a differential time-delay between two orthogonal modes of polarization) in series with a transmission line subject to polarization dispersion, it is possible to achieve optical compensation of the polarization dispersion, either by using a polarization maintaining fiber with the same DGD as the line but with the fast and slow principal states of polarization interchanged, or by having a principal state of polarization of the combination of the line and the polarization maintaining fiber coincide with the state of polarization of the source in the transmit terminal. To this end, a polarization controller is placed between the line and the polarization maintaining fiber.

An important aspect of the polarization mode dispersion phenomenon is that the DGD and the principal states of polarization of a line vary in time as a function of many factors, such as vibration and temperature. Thus, unlike chromatic dispersion, polarization dispersion must be considered a random phenomenon. In particular, the polarization dispersion of a line is characterized by a parameter referred to as the polarization mode dispersion (PMD) delay, defined as the average value of the measured DGD.

To be more precise, it can be shown that polarization dispersion can be represented by a random rotation vector $\Omega$ in Poincaré space in which the states of polarization are usually represented by a state of polarization vector S, referred to as Stokes' vector, whose tip lies on a sphere. FIG. 1 shows the principal vectors involved: the state of polarization vector S, the polarization dispersion vector $\Omega$ and the principal states of polarization vector e. $\Phi$ is the angle between S and $\Omega$.

The vectors e and Ω are in the same direction and the following equation applies: $\partial S/\partial \omega = \Omega \otimes S$, where ω is the angular frequency of the optical wave and the symbol $\otimes$ designates the vector or "cross" product.

The modulus of Ω is the value of the DGD, i.e. the propagation time-delay between two waves polarized with the two principal states of polarization of the line.

A consequence of the random nature of polarization dispersion is that compensation has to be adaptive and the differential group delay of the polarization maintaining fiber chosen has to be at least equal to the maximum differential group delay to be compensated. The compensation must ideally be such that the direction e of the principal states of polarization of the line as a whole between the signal sent and the signal received coincides at all times with the direction of the polarization vector S of the received signal. In other words, the above-defined angle Φ must be kept as small as possible.

European Patent Application EP-A-853 395 filed on Dec. 30, 1997 and published on Jul. 15, 1998 describes means for compensating polarization mode dispersion. The polarization mode dispersion compensating means are upstream of the receiver and include:

at least one polarization controller, means for generating a differential group delay between two orthogonal modes of polarization, and a control unit for controlling the polarization controller.

In one embodiment described in the above document, the control unit is adapted to maximize the degree of polarization of the signal from the differential group delay device, which is typically a polarization maintaining fiber.

Other control methods known in the art aim to minimize the spectral width of the modulation of the electrical signal obtained by detecting the optical signal from the DDG device. The measurement parameter can equally well be the weighted product of the previous two parameters, i.e. a parameter p of the form $DOP^x \cdot \Delta\omega^y$, where DOP is the degree of polarization, Δω is the spectral width and x and y are weighting coefficients optimized for the transmission system concerned.

The overall performance of the control loop must be suited to the PMD problem. In particular, its response time must be compatible with the speed of the fluctuations in the DGD observed in practice. Also, the greater the required improvement, the more accurate must it be. This condition in respect of its accuracy can be expressed by stating that the angle Φ between the direction e of the principal states of polarization of the line as a whole, between the signal sent and the signal received, and the direction of the polarization vector S of the signal received must remain at all times below a given value providing the required improvement.

It has been established experimentally that the angle Φ must in general be less than 10° and preferably less than 3°.

Knowing that the polarization vector S can rotate up to 50 times per second, it is possible to deduce the maximum response time to be imposed on the control loop, as appropriate to the required signal quality. In the general case, if Nm is the maximum number of revolutions per second of the polarization vector S and Φm is the maximum angle Φ in degrees, the maximum response time in seconds is tr=Φm/(Nm.360).

Thus for Nm=50 and Φn=10°, the maximum response time tr is 0.55 ms.

Given the above constraints, apart from the choice of the measurement parameter, the performance of the measuring, signal processing, and actuation (polarization controller) systems are critical from the point of view of the effectiveness of compensation.

From a theoretical point of view, one of the best choices for the measurement parameter would seem to be the degree of polarization mentioned above, because there is an excellent correlation between that parameter and the degree to which the error rate is degraded by PMD. Also, it can be measured quickly using dedicated electronic circuits and optical components. On the other hand, this solution is costly to implement correctly.

The spectral width of the modulation of the electrical signal is relatively less costly to measure because it is measured only in the electronic part of the receiver, but this parameter does not always correlate with the PMD, which sometimes gives worse results.

OBJECT AND SUMMARY OF THE INVENTION

The object of the invention is to reduce the fabrication cost of a device for compensating PMD by exploiting the fact that most digital optical transmission systems apply error detection and correction methods.

To this end, the invention provides a compensation device for a digital optical transmission system including a transmit terminal for sending data in the form of a polarized optical signal, a transmit optical fiber, optional optical amplifiers and a receive terminal, said device including means for compensating polarization dispersion including:

at least one polarization controller, means for generating a differential group delay between two orthogonal modes of polarization, said means and said controller being interleaved between the transmit fiber and the receive terminal, in that order, and a control unit for controlling the polarization controller, wherein the data that is transmitted consists of frames each including redundant data generated by the transmit terminal to enable the receive terminal to detect errors affecting the received frames and said control unit is adapted to minimize the error rate calculated in real time using said redundant data.

The invention is based on a number of considerations. The first is the idea that if the instantaneous error rate could be measured, it would constitute a good control parameter. Although transmission errors detected in a receiver can have many causes other than PMD, it is found that PMD is in practice the only form of interference subject to fluctuations at the speed indicated above. It can therefore be deduced that high-frequency fluctuations in the instantaneous error rate are due entirely to PMD. Consequently, if control can be based on optimizing the instantaneous error rate, combined with a sufficiently short response time to meet PMD constraints, the resulting compensation would have to take into account only the effects of PMD.

However, putting this idea into practice is still subject to the problem that, strictly speaking, direct measurement of an error rate cannot be instantaneous because it involves receiving a sufficient quantity of data to establish a statistically significant measurement.

Another consideration is the fact that the usual and/or standardized error detection and correction methods are used to calculate the error rates applying to successive data blocks directly. The results of such calculations then constitute a sampled measurement of the instantaneous error rate, whose significance increases as the quantity of data in each block increases. Finally, for a block size fixed by the detector and/or corrector code chosen, the measurement delay decreases as the transmission bit rate increases. The data sent is organized into frames, each of which includes redundant data enabling the receive terminal to detect errors in the frames it receives. An error rate can be measured only after receiving at least one complete frame, i.e. a number of bits fixed by the frame format. Although the time needed to receive a frame can be too long for a sufficiently fast control system response at a low bit rate, the situation becomes more favorable at high bit rates.

For example, in the case of the error correcting code defined in ITU-T Recommendation G.975 for submarine transmission systems, the frame is made up of 32 640 bits. At a bit rate of 10 Mbit/s the time to read a frame is 3 ms, but at a bit rate of 10 Gbit/s that time falls to only 3 $\mu$s. That delay should be compared with the control system response time of 0.55 ms previously mentioned.

What is more, the number of errors detected per frame can be reduced to zero if the quality of the compensated signal increases. The error rate can then no longer provide a basis for evaluating the signal quality. As a result of this, the control optimization algorithm no longer contributes to improving signal quality through PMD compensation. Also, it is advantageous for the calculation of the error rate to be based on the number of errors affecting several successive received frames.

However, it should be noted that the possibility of inadequate control when the error rate is very low is not a problem if the code used is an error correcting code, because a small number of errors can normally be corrected. However, even in the case of an error correcting code, it can be beneficial to calculate the error rate from several successive frames, because this enables the algorithm to be provided with an error rate measurement subject to discontinuities of limited amplitude. Moreover, control is kept active to compensate PMD drift as well, which is much slower than the fast fluctuations previously referred to.

The number of successive frames is advantageously chosen to allow for the maximum response time that the control system must comply with for effective PMD compensation. That number will therefore be a function of the maximum response time, the frame length, the transmission bit rate and the response times of the other components of the control system, in particular the optimization algorithm.

Accordingly, generally speaking, and in accordance with one particular aspect of the invention, the number of successive frames is such that the control means have a response time and an accuracy such that the angle between the direction of the principal states of polarization of the whole of the line, between the sent signal and the received signal, and the direction of the polarization vector of the received signal remains less than 10° at all times and preferably less than 3°.

The invention also provides an optical transmission system incorporating the compensating means defined hereinabove. The optical transmission system can be a single-channel system, i.e. a system designed to convey a signal carried by only one wavelength, or a wavelength division multiplex (WDM) system, i.e. a system designed to convey a signal made up of a plurality of channels with different carrier wavelengths. In the latter case, specific compensation must be applied to each channel. To this end, the system according to the invention includes means for extracting at least one channel in the receiver and compensating means associated with that channel.

BRIEF DESCRIPTION OF THE DRAWINGS

Other aspects and advantages of the invention become apparent in the description given below with reference to the figures.

FIG. 1 represents the Poincaré space as already commented on.

FIG. 2 is a diagram showing an optical transmission system including compensating means according to the invention.

FIG. 3 shows the control means of the compensating means according to the invention in more detail.

FIG. 4 shows one example of a coder for constructing the frames that are sent, including payload data and redundant data for detecting and correcting errors.

FIG. 5 shows timing diagrams for the clock signals of the code from FIG. 4.

FIG. 6 shows a corresponding example of a decoder in the receive terminal and additional means for implementing the invention.

MORE DETAILED DESCRIPTION

FIG. 2 shows diagrammatically and by way of example an optical transmission system equipped with compensating means according to the invention.

The example shown is a wavelength division multiplex system adapted to convey a plurality of channels Se$\lambda$, Se$\lambda$', Se$\lambda$" with respective carrier wavelengths $\lambda$, $\lambda$', $\lambda$". Each channel, for example the channel Se$\lambda$, originates from a transmit terminal TX sending an optical signal taking the form of amplitude (and/or optical frequency) modulation of a polarized carrier wave. The channels are combined in a multiplexer 1 whose output is connected to an optical transmission line. That line typically consists of an optical fiber LF and can incorporate optical amplifiers (not shown) at the upstream and/or downstream end of the fiber. The line can equally well consist of a plurality of sections of fiber with optical amplifiers between them.

The end of the line is connected to at least one receiving terminal, for example the terminal RX, via a demultiplexer 2 whose function is to extract the channel Sr$\lambda$ addressed to the receiver RX.

The system includes polarization dispersion compensating means CM disposed between the demultiplexer 2 and the receiver RX and including:

at least one polarization controller PC, means DDG for generating a differential group delay between two orthogonal polarization modes, and a control unit CU for the polarization controller PC.

The differential group delay device DDG is a polarization maintaining fiber, for example. The control unit CU is adapted to minimize the error rate calculated from the number of errors detected by the decoder in the receive terminal RX.

A single-channel system differs from the previous system in that the multiplexer 1 and the demultiplexer 2 are absent.

FIG. 3 shows in more detail the part of the receive terminal in which the invention is implemented and the control unit CU for the compensating means.

The receiver includes a detector 3 such as a photodiode for converting the optical signal Sr$\lambda$ from the differential group delay device DDG into an electrical signal Sr. The signal Sr is received by a clock recovery circuit 4 and by a decoder 5. The circuit 4 supplies the decoder 5 with the clock signals CKi' necessary for synchronous processing of the signal Sr.

In a manner that is conventional for error detecting and correcting codes, the decoder 5 calculates for each frame a plurality of error syndromes representative of the number of errors detected in that frame and their locations. The decoder 5 determines the corrections to be effected on the basis of those syndromes and if the number of errors does not exceed the correction capacity of the code. The decoder also determines the number of errors affecting each frame.

In one particular embodiment using several interleaved codes, for example Reed-Solomon codes, the decoder includes a plurality of individual decoders supplying a plurality of corresponding numbers Es of errors. The control unit CU includes adder means 6 adapted to receive those numbers and to calculate their sum. The sum Ne is transmitted in the form of a binary number to a processor unit PU via an interface circuit 7.

The outputs of the processor unit PU control the polarization controller PC via a digital-to-analogue converter DAC.

The processor unit PU is programmed to execute an optimization algorithm for determining the commands to be applied to the polarization controller PC for the measured error rate to be held at a minimum value.

The successive numbers Ne of errors received by the processor unit PU inform it of the error rate. The estimate of the error rate that the processor unit produces therefrom can therefore be updated after each frame is received and constitutes a sampled real time measurement of the instantaneous error rate.

To execute the optimization algorithm, the processor unit can simply use as the parameter to be optimized the number Ne of errors detected in each frame. This solution procures the best control response time.

However, for the reasons previously indicated, a more suitable parameter could be the cumulative numbers of errors affecting a plurality of successive received frames. This mode of operation can be programmed to execute automatically, for example if the number of errors detected per frame falls below a particular value.

The optimization algorithm is a multidimensional algorithm and controls at least two variable parameters of the polarization controller. There are many multidimensional algorithms, and an algorithm designed to use the Powell method can be used, for example, as described in pages 412 to 420 of "Numerical Recipes in C" by William H. Press et al., Cambridge University Press, 1994.

The performance of the control loop as a whole must match the PMD problem. In particular, its response time must be compatible with the speed of PMD fluctuations observed in practice. Also, it must be sufficiently accurate for the angle $\Phi$ between the direction e of the principal states of polarization of the line as a whole, between the sent signal Se$\lambda$ and the received signal Sr$\lambda$, and the direction of the polarization vector S of the received signal Sr$\lambda$ to remain at all times below a given value achieving the required improvement in signal quality.

It has been established experimentally that this angle must in general remain below 10° and preferably below 3°.

The minimum response time to be imposed on the control loop to suit the required signal quality can be deduced knowing that the polarization vector S can rotate up to 50 times per second. In practice, it is necessary to have a response time less than one millisecond, for example.

To illustrate one preferred embodiment, a description will be given of how the invention can be put into effect in the case of the forward error correction code for submarine systems which is the subject matter of ITU-T Recommendation G.975. For conciseness, not all of the details set out in the recommendation are described here.

The error correcting code uses a plurality of interleaved Reed-Solomon codes. Each of the Reed-Solomon codes applies to 8-bit symbols and is an RS(255,239) code, i.e. it is organized into code words consisting of 255 bytes, 239 of which are data bytes and 16 of which are redundant bytes. The RS(255,239) code generates 16 error syndromes and can correct eight erroneous bytes simultaneously in each code word of 255 bytes.

Interleaving and parallel-serial conversion then form frames. The number of RS(255,239) codes interleaved is 16, for example, enabling up to 1 024 erroneous bits to be corrected in each frame of 32 640 bits.

By way of illustration, FIG. 4 shows a circuit diagram of the coder part of the transmit terminal TX. To simplify the description, only the case of four interleaved RS(255,239) codes is shown. FIG. 5 shows timing diagrams of clock signals controlling the coder.

The payload data to be transmitted is assumed to be initially serial binary data in the form of an electrical signal Ee. The data is synchronized to a clock signal CK0 shown in FIG. 5, whose period T corresponds to the bit time of the serial signal Ee.

The serial signal Ee first enters a series/parallel converter to be formed into bytes. The converter 9 is typically a shift register with a capacity of 8 bits receiving the signal Ee at its zero input and clocked by the clock CK0.

The parallel output of the shift register 9 is connected to each of the inputs of four 8-bit registers 11 to 14. Writing in these registers is enabled by the respective clock signals CK1 to CK4 shown in FIG. 5. Each of these clock signals has a period 4T and three of them have respective time shifts relative to the fourth one of T, 2T and 3T.

The outputs of the registers 11 to 14 are connected to respective inputs of the RS(255,239) coders 21 to 24. The coders are synchronized in write mode by respective clock signals CK1 to CK4 and in read mode by respective clock signals CK1' to CK4' analogous to the signals CK1 to CK4 but having a higher frequency. This is to increase the output data rate to compensate the introduction of redundant data generated in these coders.

The outputs of the coders 21 to 24 are connected to output buffer registers 31 to 34, reading of which is enabled by the respective clock signals CK1' to CK4'.

The outputs of the registers 31 to 34 are each connected to the parallel input of an output shift register 15 clocked by a clock CK0' at four times the frequency of the signals CK1' to CK4'. The serial output of the register 15 delivers the serial signal Se which is then converted into an optical signal Se$\lambda$ by an electro-optical converter 16. After optional amplification, the signal Se$\lambda$ is coupled into the transmission fiber.

FIG. 6 shows a corresponding example of a decoder of the receive terminal and additional means for implementing the invention.

The optical signal Sr$\lambda$ received after transmission is first converted into a serial electric signal Sr by means of a photodetector 3. The signal Sr is delivered to a clock recovery circuit 17 in the receive terminal adapted to generate the clock signals CK0' to CK4' previously defined. The signal Sr is also applied to the input of an 8-bit shift register 10 clocked by the clock CK0'.

The parallel output of the shift register 10 is connected to each of the inputs of four 8-bit registers 41 to 44, writing of which is enabled by respective clock signals CK1' to CK4'. The registers 10 and 41 to 44 therefore perform the serial-parallel conversion and de-interleaving operations on the receive frames.

The outputs of the registers 41 to 44 are connected to respective inputs of the RS(255,239) decoders 51 to 54. The decoders are synchronized in write mode by the respective clock signals CK1' to CK4'.

The decoders 51 to 54 deliver respective signals Es1 to Es4 representative of the numbers of errors that they have detected in the last frame received and decoded. The signals Es1 to Es4, each of which takes the form of a binary number, are applied to the input of the adder 6 adapted to generate a signal Ne representative of their sum.

The signal Ne is then transmitted to the processor unit PU via the line interface 7.

Reed-Solomon coders and decoders are well-known in the art and are therefore not described in more detail. With regard to implementing them, see for example "Error control coding" by SHU LIN and Daniel J. COSTELLO, JR, 1983, published by Prentice-Hall.

What is claimed is:

1. A compensator device for a digital optical transmission system including a transmit terminal for sending data in the form of a polarized optical signal, a transmit optical fiber, optional optical amplifiers and a receive terminal, said device including means for compensating polarization dispersion including:

at least one polarization controller, means for generating a differential group delay between two orthogonal modes of polarization, said means and said controller being interleaved between the transmit fiber and the receive terminal, in that order, and a control unit for controlling the polarization controller, wherein the data that is transmitted consists of frames each including redundant data generated by the transmit terminal to enable the receive terminal to detect errors affecting the received frames and said control unit is adapted to minimize the error rate calculated in real time using said redundant data.

2. A compensator device according to claim 1, wherein said control unit calculates said error rate on the basis of numbers of errors affecting a plurality of successive received frames.

3. A compensator device according to claim 2, wherein the number of successive received frames is such that the control unit has a response time and an accuracy such that the angle between the direction of the principal states of polarization of the line as a whole, between the sent signal and the received signal, and the direction of the polarization vector of the received signal remains at all times less than 10°.

4. A compensator device according to claim 3, wherein said number of successive frames is such that said angle remains less than 3°.

5. An optical transmission system, including a compensator device according to claim 1.

6. An optical transmission system for a signal with a plurality of wavelength division multiplexed channels, the system including means for extracting in the receiver at least one of said channels and compensating means associated with said extracted channel and conforming to claim 1.

* * * * *